US011151202B2

(12) United States Patent
Katz et al.

(10) Patent No.: US 11,151,202 B2
(45) Date of Patent: *Oct. 19, 2021

(54) EXPLOITING ANSWER KEY MODIFICATION HISTORY FOR TRAINING A QUESTION AND ANSWERING SYSTEM

(71) Applicant: International Business Machines Corporation, Armonk, NY (US)

(72) Inventors: Edward G. Katz, Washington, DC (US); John A. Riendeau, Madison, WI (US); Sean T. Thatcher, Stone Ridge, VA (US); Alexander C. Tonetti, Washington, DC (US)

(73) Assignee: International Business Machines Corporation, Armonk, NY (US)

( * ) Notice: Subject to any disclaimer, the term of this patent is extended or adjusted under 35 U.S.C. 154(b) by 882 days.

This patent is subject to a terminal disclaimer.

(21) Appl. No.: 15/799,136

(22) Filed: Oct. 31, 2017

(65) Prior Publication Data

US 2019/0065600 A1 Feb. 28, 2019

Related U.S. Application Data

(63) Continuation of application No. 15/692,058, filed on Aug. 31, 2017.

(51) Int. Cl.
*G06F 16/951* (2019.01)
*G06F 16/34* (2019.01)
(Continued)

(52) U.S. Cl.
CPC ...... *G06F 16/951* (2019.01); *G06F 16/24522* (2019.01); *G06F 16/345* (2019.01); *G06F 16/353* (2019.01); *G06F 16/24578* (2019.01)

(58) Field of Classification Search
CPC ......... G06F 16/24522; G06F 16/24578; G06F 16/345; G06F 16/353; G06F 16/951
See application file for complete search history.

(56) References Cited

U.S. PATENT DOCUMENTS 7,966,316 B2 6/2011 Cao et al.
8,738,617 B2 5/2014 Brown et al.
(Continued)

FOREIGN PATENT DOCUMENTS

CN 102495860 A 6/2012

OTHER PUBLICATIONS

Eric Brill et al., An Analysis of the AskMSR Question-Answering System, Jan. 1, 2002 http://susandumais.com/emnlp_final.pdf.
(Continued)

*Primary Examiner* — Kamran Afshar
*Assistant Examiner* — Brent Johnston Hoover
(74) *Attorney, Agent, or Firm* — Terrile, Cannatti & Chambers, LLP; Michael Rocco Cannatti

(57) ABSTRACT

A system and a computer program product are provided for evaluating question-answer pairs in an answer key by generating a predicted answer to a test question based on the answer key modification history for comparison matching against a generated answer that is generated in response to the test question, and then comparing the predicted answer and generated answer to determine an accuracy score match indication therebetween so as to present an indication that the answer key may have a problem if there is a match between the predicted answer and generated answer.

8 Claims, 3 Drawing Sheets

(51) Int. Cl.
  *G06F 16/35*   (2019.01)
  *G06F 16/2452* (2019.01)
  *G06F 16/2457* (2019.01)

(56) References Cited

U.S. PATENT DOCUMENTS

| | | | |
|---|---|---|---|
| 8,959,043 | B2 | 2/2015 | Ferucci et al. |
| 9,063,975 | B2 | 6/2015 | Isensee et al. |
| 9,336,485 | B2 | 5/2016 | Haggar et al. |
| 9,471,689 | B2 | 10/2016 | Allen et al. |
| 9,619,513 | B2 | 4/2017 | Bradley et al. |
| 10,248,689 | B2 | 4/2019 | Brennan et al. |
| 10,628,413 | B2 | 4/2020 | Bishop et al. |
| 10,628,521 | B2 | 4/2020 | Bishop et al. |
| 2006/0206481 | A1 | 9/2006 | Ohkuma et al. |
| 2009/0259642 | A1 | 10/2009 | Cao et al. |
| 2012/0077178 | A1 | 3/2012 | Bagchi et al. |
| 2013/0097178 | A1 | 4/2013 | Song et al. |
| 2013/0304730 | A1 | 11/2013 | Zhou |
| 2014/0201217 | A1 | 7/2014 | Hatami-Hanza |
| 2015/0170057 | A1* | 6/2015 | Allen .............. H04L 67/10 706/11 |
| 2015/0179082 | A1* | 6/2015 | Byron .............. G09B 7/00 434/322 |
| 2016/0034457 | A1* | 2/2016 | Bradley .......... G06F 16/24522 707/749 |
| 2016/0179862 | A1 | 6/2016 | Allen et al. |
| 2016/0293034 | A1 | 10/2016 | Agarwalla et al. |
| 2017/0004204 | A1 | 1/2017 | Bastide et al. |

OTHER PUBLICATIONS

Rob High, "The Era of Cognitive Systems: An Inside Look at IBM Watson and How it Works," IBM Redbooks, 2012.
Yuan et al., "Watson and Healthcare," IBM developerWorks, 2011.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.
List of IBM Patents or Applications Treated as Related.

* cited by examiner

EXPLOITING ANSWER KEY MODIFICATION HISTORY FOR TRAINING A QUESTION AND ANSWERING SYSTEM

BACKGROUND OF THE INVENTION

In the field of artificially intelligent computer systems capable of answering questions posed in natural language, cognitive question answering (QA) systems (such as the IBM Watson™ artificially intelligent computer system or and other natural language question answering systems) process questions posed in natural language to determine answers and associated confidence scores based on knowledge acquired by the QA system. To train such QA systems, users may generate question-answer (QA) pairs, also known as answer keys, from fact statements for submission to the QA system, but answers and/or questions in the training QA pairs can be incorrect or inaccurate, particularly when new data is ingested into the system corpus, making it difficult to keep the answer key current. The time and resources needed to conduct the fact checking needed to verify and correct training QA pairs is large and also error prone due to the manual operation of the fact checking. Such inaccuracies, if not corrected with cumbersome and time intensive answer correction processing tasks, can result in answer-key problems—such as semantically correct answers missing from the answer key, syntactically correct answers missing from the answer key, and/or inadequate QA pairs—which in turn impair the accuracy of the QA system. At the same time, efforts to keep the answer key current should not impose a penalty for correct answers simply because the answer key is dated. As a result, the existing solutions for efficiently generating and verifying accurate question and/or answer keys for training QA pairs are extremely difficult at a practical level.

SUMMARY

Broadly speaking, selected embodiments of the present disclosure provide a system, method, and apparatus for identifying question set answer key problems by using the cognitive power of the information handling system to exploit historical changes in the question set answer key to identify potential problems and/or updates for the answer key, thereby providing more accurate training data for a question answering (QA) system as it ingests new material and/or assistance with maintaining accurate question set answer keys. To identify potential question set answer key problems, the information handling system generates an answer in response to a test question from an answer key and evaluates the answer for correctness. For any generated answer that is scored as incorrect by the answer key, the information handling system retrieves answers and metadata associated with the answer key over time to generate a predicted answer to the test question. In selected embodiments, the answers and metadata are retrieved by collecting the change set of answer key from all previous answers to the question along with associated metadata to detect a pattern of changes in the answer key along with the associated metadata to compute the predicted answer. In other embodiments, the retrieved answers and metadata may include the previous answers from the answer key along with metadata identifying the author for each QA pair which may be used to identify a trust or reliability measure for each generated answer. However generated, the predicted answer is then compared to the generated answer to generate an accuracy score which may indicate a prediction of likelihood that the generated answer is correct. Based on the comparative analysis, the generated answer, though initially scored by the answer key as "incorrect," may be highlighted to the user for use in augmenting the answer key as another correct answer if the comparison indicates that there is a match between the generated answer and predicted answer. In addition or in the alternative, the predicted answer may be highlighted to the user for use in augmenting the answer key as another correct answer. In selected embodiments, the test question may be scored as correct and flagged with the generated answer and/or predicted answer for review and possible update of the answer key. In this way, the domain expert or system knowledge expert can use the accuracy score to review, evaluate, and accept proposed updates to the answer key based on returned answers that match with predicted answers derived from the historical answers and metadata associated with the answer key. Alternatively, the domain expert or system knowledge expert can use the accuracy score to identify a mismatch between the generated answer and the predictive answer when the accuracy score indicates an uncertainty associated with the mismatch.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
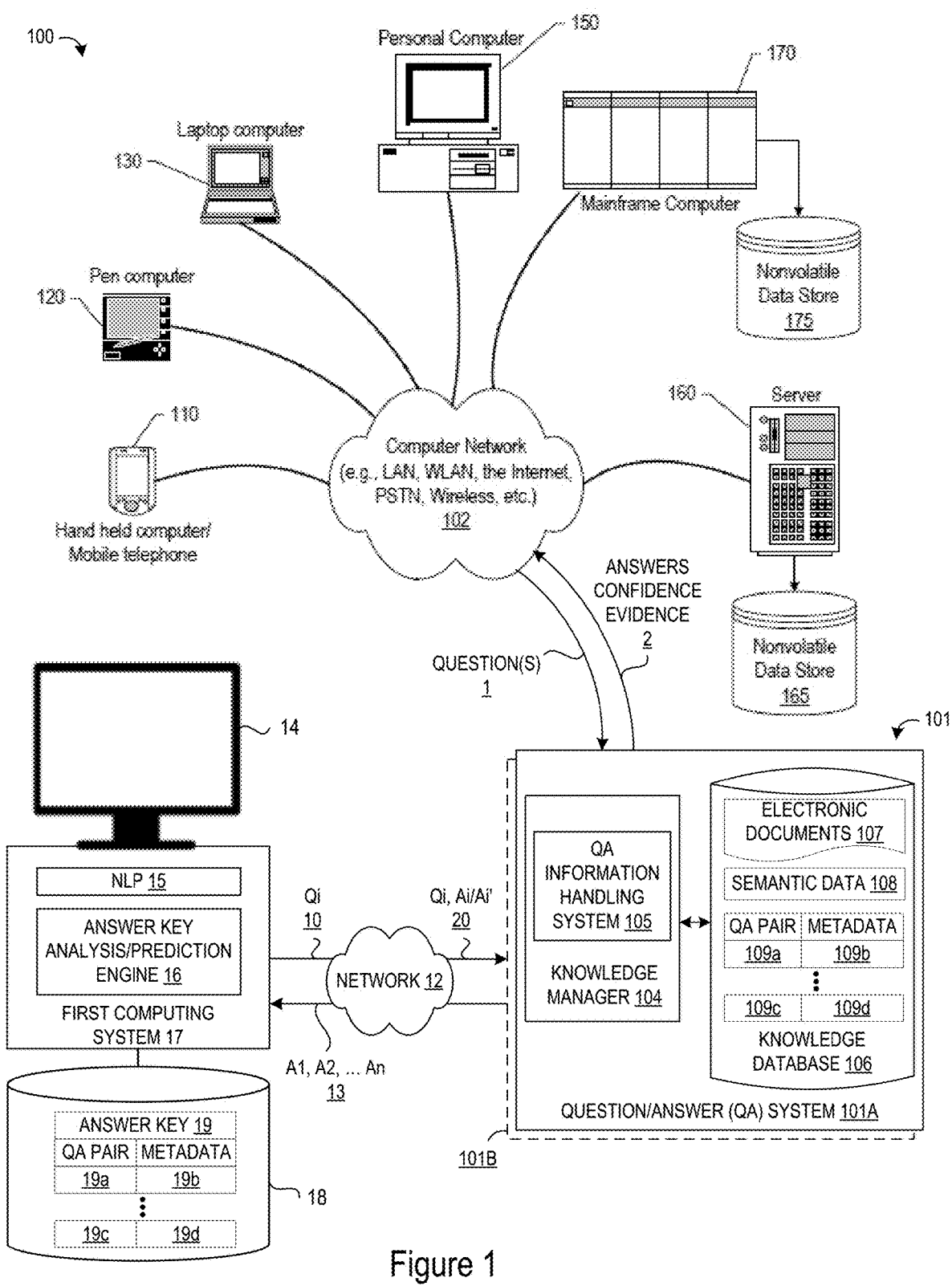
FIG. 1 depicts a system diagram that includes a QA system connected in a network environment to a computing system that uses an answer key analysis engine to identify and correct answer key problems.

A method, system, apparatus, and a computer program product are provided for exploiting an answer key's modification history to improve the training of a QA system. As disclosed, question-answer pairs in an answer key are evaluated against predicted answers derived from the historical answers and metadata associated with the answer key by generating answers from test questions submitted to the QA system and comparing generated answers that are scored incorrect by the answer key to the predicted answers, with any matches from the comparison being used to flag the test question with the generated answer and/or predicted answer for domain expert review and evaluation as a possible update for the answer key. In disclosing the claimed method and system for exploiting the answer key modification history and metadata by using specific rules, rather than humans, to evaluate generated answers against predicted answers to find matches indicating that the generated answer should be evaluated for updating the answer key, there is disclosed an improvement in computer-related technology that previously could only be produced by humans, if at all.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention. Thus embodied, the disclosed system, a method, and/or a computer program product is operative to improve the functionality and operation of a cognitive question answering (QA) systems by efficiently providing answer keys with more accurate training QA pairs.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram 100 of one illustrative embodiment of a question/answer (QA) system 101 connected across a computer network 12 to a first computing system 17 that uses an answer key analysis engine 16 to identify and correct answer key problems. The QA system 101 may include one or more QA system pipelines 101A, 101B, each of which includes a knowledge manager computing device 104 (comprising one or more processors and one or more memories, and potentially any other computing device elements generally known in the art including buses, storage devices, communication interfaces, and the like) for processing questions 10 received over the network 12 from the first computing device 17 along with questions received over the network 102 from one or more users at computing devices (e.g., 110, 120, 130). Over the networks 12, 102, the computing devices and QA system 101 communicate with each other and with other devices or components via one or more wired and/or wireless data communication links, where each communication link may comprise one or more of wires, routers, switches, transmitters, receivers, or the like. In this networked arrangement, the QA system 101 and networks 12, 102 may enable question/answer (QA) generation functionality for one or more content users. Other embodiments of QA system 101 may be used with components, systems, sub-systems, and/or devices other than those that are depicted herein.

In the QA system 101, the knowledge manager 104 may be configured to receive inputs from various sources. For example, knowledge manager 104 may receive input from the networks 12, 102, one or more knowledge bases or corpora 106 of electronic documents 107, semantic data 108, or other data, content users, and other possible sources of input. In selected embodiments, the knowledge base 106 may include structured, semi-structured, and/or unstructured content in a plurality of documents that are contained in one or more large knowledge databases or corpora. The various computing devices (e.g., 110, 120, 130) on the network 102 may include access points for content creators and content users. Some of the computing devices may include devices for a database storing the corpus of data as the body of information used by the knowledge manager 104 to generate answers to cases. The networks 12, 102 may each include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in an electronic document 107 for use as part of a corpora 106 of data with knowledge manager 104. The corpora 106 may include any structured and unstructured documents, including but not limited to any file, text, article, or source of data (e.g., scholarly articles, dictionary definitions, encyclopedia references, and the like) for use in knowledge manager 104. Content users may access knowledge manager 104 via a network connection or an Internet connection to the network 102, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question 1. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions 1 (e.g., natural language questions, etc.) to the knowledge manager 104. Knowledge manager 104 may interpret the question and provide a response to the content user containing one or more answers 2 to the question 1, alone or in combination with supporting evidence and confidence metrics for each answer. In some embodiments, knowledge manager 104 may provide a response to users in a ranked list of answers 2.

In some illustrative embodiments, QA system 101 may be the IBM Watson™ QA system available from International Business Machines Corporation of Armonk, N.Y., which is augmented with the mechanisms of the illustrative embodiments described hereafter to implement Watson Discovery Advisor functionality. The IBM Watson™ knowledge manager system may receive an input question 1 which it then parses to extract the major features of the question, that in turn are then used to formulate queries that are applied to the corpus of data stored in the knowledge base 106. Based on the application of the queries to the corpus of data, a set of hypotheses, or candidate answers to the input question, are generated by looking across the corpus of data for portions of the corpus of data that have some potential for containing a valuable response to the input question.

In particular, a received question 1 may be processed by the IBM Watson™ QA system 101 which performs deep analysis on the language of the input question 1 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e., candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 101 then generates an output response or answer 2 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In addition to providing answers to questions, QA system 101 is connected to a first computing system 17 which identifies and corrects answer key problems in a QA pair list 19 which may be used to train the QA system 101. Though shown as being connected across a network 12, the QA system 101 may be directly connected to the first computing system 17 or indirectly connected via the computer network 102. Alternatively, the functionality described herein with reference to the first computing system 17 may be embodied in or integrated with the QA system 101. To train the QA system 101, the first computing system 17 may be configured to store the QA pair list 19 of question-answer pairs (e.g., 19a, 19c) in a database 18, alone or in combination with associated answer key metadata information (e.g., 19b, 19d). However, the answers and/or question in the QA pair list 19 can be incorrect or inaccurate, particularly when new data is ingested into the system corpus, making it difficult to keep the answer key current (e.g., when the question or answer information becomes stale).

To ensure the accuracy of the QA pair list 19, the first computing system 17 may be configured to assist with updating the answer key 19 by exploiting historical changes to the answer key to identify answers Ai 13 from the QA system 101 and/or to generate predicted answers Ai' that should be evaluated for updating the answer key 19. In selected embodiments, the answer key 19 is updated by using an answer key analysis engine 16 to (1) submit a test question 10 from the answer key 19 to the QA system 101, (2) receive one or more answers Ai 13 generated and returned by the QA system 101, (3) evaluating the received answers Ai 13 against the answer key 19 to identify incorrect answers Ai, (4) collect previous answers and metadata associated with the test question from the answer key 19, (5) generate a predicted answer Ai' to the test question from the previous answers and metadata associated, alone or combination with an optional answer tolerance or range and/or accuracy score, for comparison with the received answer Ai, and (6) flag the test question in the answer key for possible update with the predicted answer and/or with the generated answer if the comparison indicates a match between the generated answer and predicted answer. To obtain the one or more answers Ai 13, the first computing system 17 may be configured to process each question-answer pair (e.g., 19a, 19c) by passing each question Qi 10 to the QA system 101. In response to a received question Qi 10, the knowledge manager 104 and/or QA information handling system 105 generates answers A1, A2, . . . An 13 which are sent back to the first computing system 17. To compare the first answer key answer from the QA pair list (e.g., 19a) to the returned answer(s) Ai 13, the answer key analysis engine 16 may use natural language processing (NLP) or any known similarity calculation engine (e.g., Alchemy API™) to determine the similarity level between the first answer key answer 19a and the returned answer(s) 13 for purposes of determining whether the returned answer is correct and should be further evaluated for updating the answer key 19 with information from the returned answer(s) 13.

In selected embodiments, the answer key analysis engine 16 may use natural language (NL) processing to compare the first answer key answer 19a to the returned answers Ai 13 based on one or more specified similarity metric values. For each returned answer(s) Ai 13 which is incorrect, the answer key analysis engine 16 may use the answer key modification history for the first answer key answer 19a to find previous answers to the test question along with associated metadata information 19b, and to compute therefrom a predicted answer Ai to the test question, alone or combination with an optional answer tolerance or range and/or accuracy score.

To provide a specific training session example, suppose the answer key 19 currently has the following edit or answer key history for a specific question:

| Date | Question Text | Answer |
|---|---|---|
| Jul. 1, 2014 | What is the population of the United States? | 317.68 million |
| Jul. 1, 2005 | What is the population of the United States? | 295.52 million |
| Jul. 1, 2000 | What is the population of the United States? | 282.16 million |

In this training session example, if the QA system 101 produces a generated answer 13 (e.g., 323.64 million) for a test question, the answer key analysis engine 16 would determine that the generated answer is incorrect based a comparison with the current answer (e.g., 317.68 million) in the answer key. But by applying NLP techniques to evaluate the answer history, the answer key analysis engine 16 may determine that the question has a degree of temporal relevance so as to allow some latitude when determining the correctness of the answer 13 generated by QA system 101 by looking back through the entries in the answer key to determine that it is regularly and somewhat predictably changing. With such historical answers and metadata, the answer key analysis engine 16 could then compute a predicted answer Ai, such as by doing some basic fitting to determine an expected current value based on the past data to check whether a generated answer Ai is within a relatively likely range of correctness for the current value. Continuing with the training session example, the answer key analysis engine 16 may analyze the answer history to arrive at a prediction Ai' of the correct current answer (or range of answers) for this question, such as by performing a statistical analysis of the time series to arrive at an interval of values within which the answer could be expected to fall. For example, a linear model might be applied to compute a predicted answer Ai' that should be "325.34 million" plus or minus 10%. In this way, the system could avoid erroneously penalizing scorers which are producing good answers that simply suffer from a mismatch between the date of the corpus and the age of the information in the answer key.

If the predicted answer Ai' matches with the generated answer(s) Ai from the QA system 101, then the answer key analysis engine 16 generates a review message 20 for the QA system 101 indicating that there may be a problem with the first answer key answer and that the returned answer(s) 13 and/or predicted answers Ai may be equivalent or acceptable for inclusion in the first answer key answer. In addition, the returned answer(s) 13 may be highlighted to the user at display 14 for use in augmenting the first answer key answer 19a as another correct answer. In addition or in the alternative, the predicted answer(s) Ai' may be highlighted to the user at display 14 for use in augmenting the first answer key answer 19a as another correct answer. In selected embodiments, the answer key analysis engine 16 may use the predicted answer Ai' to compute an accuracy score for the generated answer Ai 13 which is in the review message 20 to the QA system 101. Using the accuracy score, the domain expert or system knowledge expert can review and evaluate proposed updates to the answer key based on returned answers.

Types of information handling systems that can utilize QA system 101 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
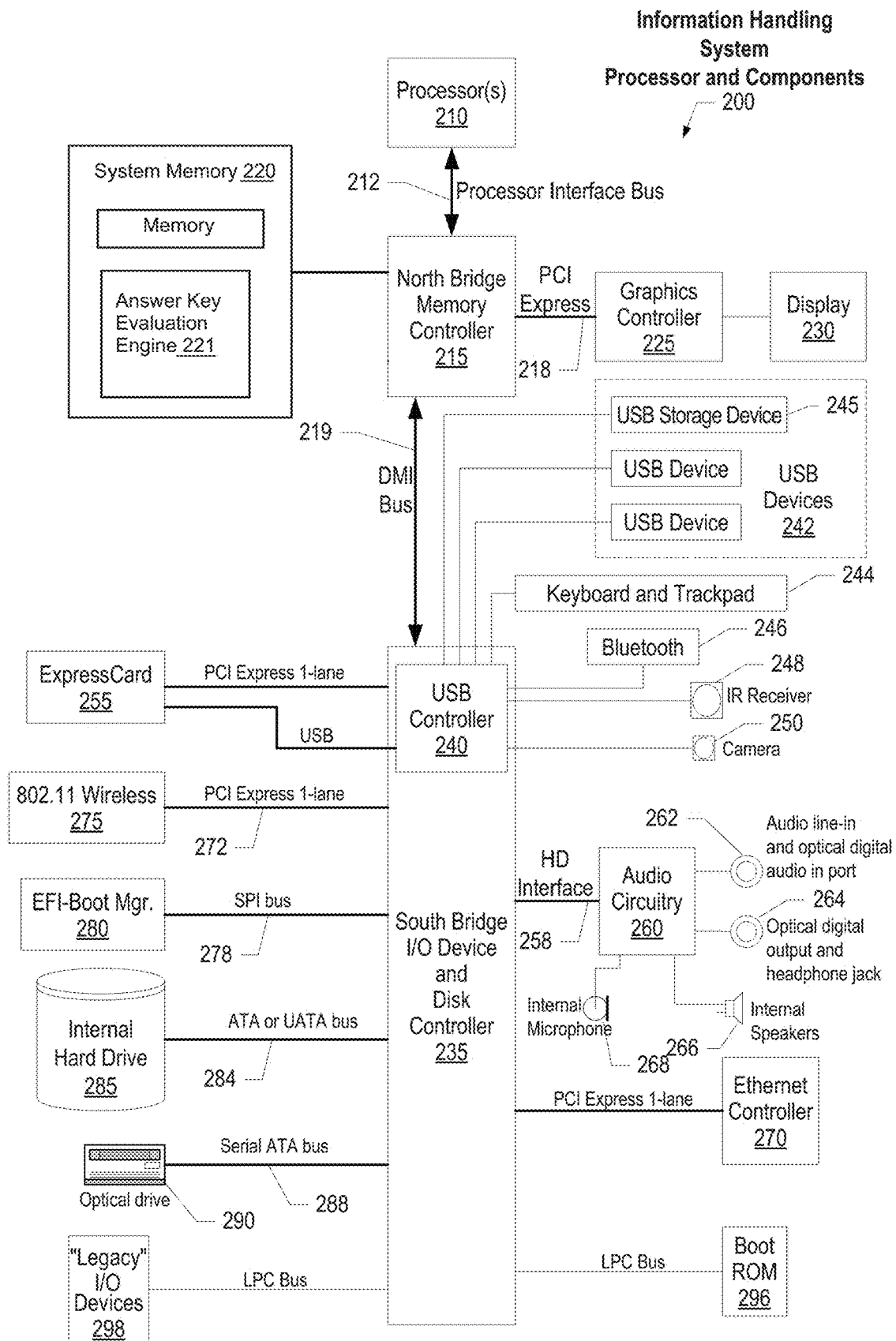
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory device, including an answer key evaluation engine module 221 which may be invoked to compare one or more generated answers, passages and sentences returned from a computing system (e.g., an IBM Watson™ QA system) to specified answers in the answer key using a semantic analysis, and then to identify potential answer key updates by evaluating the generated answers against predicted answers that are derived from answer key history and metadata, such as by computing a predicted answer from the answer key modification history and inserting the predicted answer and/or generated answer into the answer key if there is a match therebetween. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus.

Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
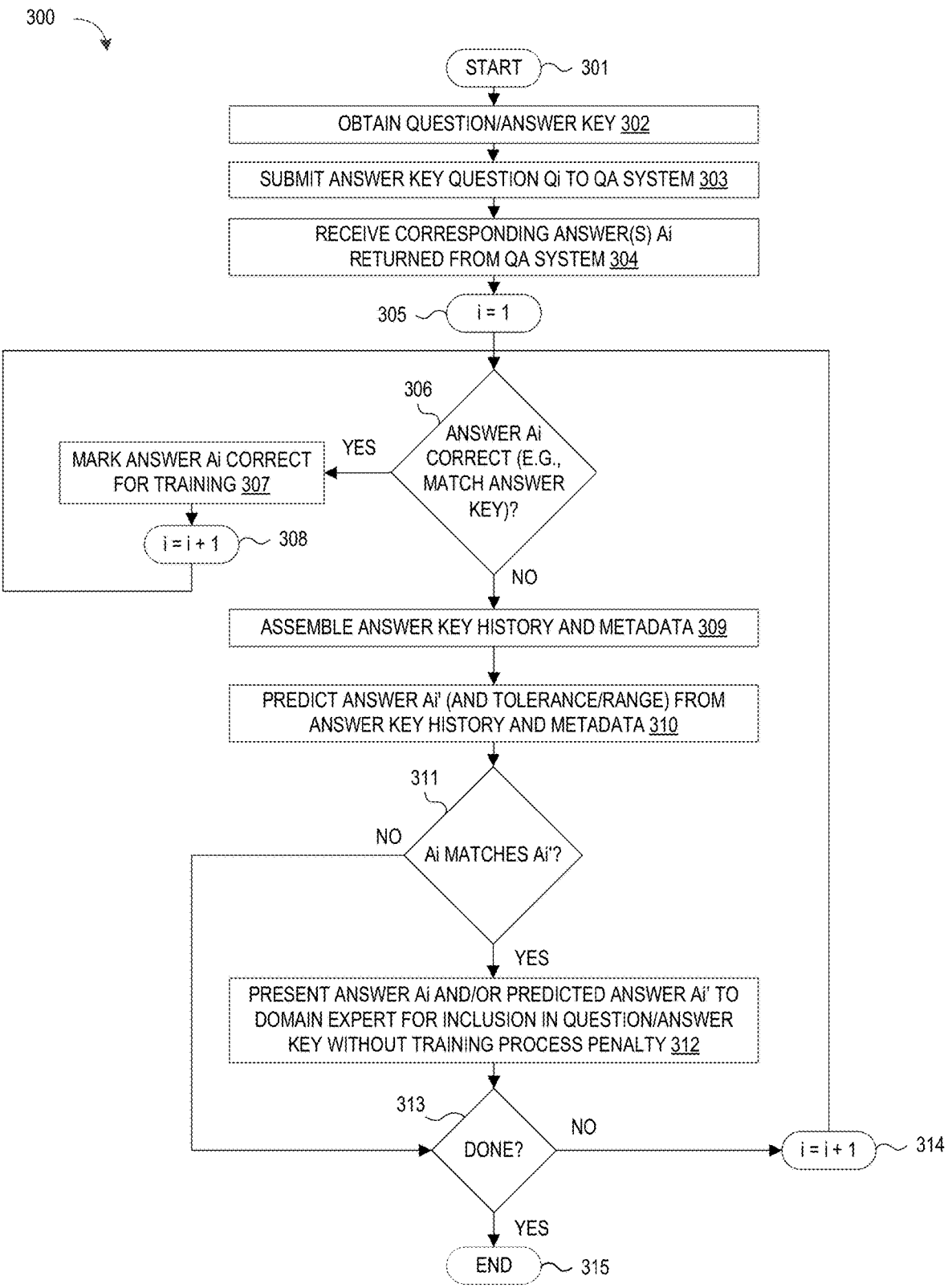
FIG. 3 illustrates a simplified flow chart showing the logic for identifying and correcting answer key problems by exploiting historical changes in the question set answer key to identify potential updates to the answer key with answers returned from the QA system which match predicted answers derived from the answer key history and metadata.

To provide additional details for an improved understanding of selected embodiments of the present disclosure, reference is now made to FIG. 3 which depicts a simplified flow chart 300 showing the logic for identifying and correcting answer key problems by exploiting historical changes in the question set answer key to identify potential updates to the answer key with answers returned from the QA system, such as QA system 101 shown in FIG. 1, which match predicted answers derived from the answer key history and metadata. The processing shown in FIG. 3 may be performed by a cognitive system, such as the first computing system 17, QA system 101, or other natural language question answering system and/or computing system, method, or module. Wherever implemented, the disclosed answer key evaluation scheme identifies answer key problems in question-answer pairs by comparing a returned answer from a QA system to a predicted answer that is derived from the answer key modification history (e.g., answer history and associated metadata) to find other correct answers. The comparison processing may include determining a similarity level between the answer key answer and one or more generated answers returned in response to a test question, indicating if the answer key answer is correct or incorrect based on a similarity level with the answer key, and generating a predictive answer to the test question based on analysis of changes to correct answers to the test question over a history of time, as given in the answer key, comparing the predictive answer to the generated answer(s) to form an accuracy score, and performing an action to update the answer key with the predictive answer and/or generated answer based on the accuracy score. With the disclosed answer key evaluation scheme, an information handling system can be configured to identify and correct answer key problems in a training set of QA pairs, thereby improving the accuracy of training for the QA system.

FIG. 3 processing commences at 301 whereupon, at step 302, a question/answer key is obtained. For example, a previously generated answer key may be retrieved from memory storage, or a received statement may be decomposed into one or more sets of questions and answer pairs, such as the QA pair list 19 stored in a database 18, alone or in combination with associated answer key metadata (e.g., information identifying the authorship and creation data for each QA pair). The processing at step 302 may be performed at the first computing system 17, the QA system 101 or other NLP question answering system.

At step 303, the evaluation processing of each answer Ai in the QA key begins by submitting the corresponding question Qi from the QA key to a computing system. For example, a first computing system (e.g., computing system 17) may send the corresponding questions of the question and answer pair sets, e.g., via a network (e.g., a network 12 including, but not limited to Intranet, Internet, Wireless communication network, Wired communication network, Satellite communication network, etc.) to a second computing system. The second computing system can process a natural language text and can provide answers to questions expressed in natural language. The second computing system may be embodied, but is not limited to, an artificial intelligent computer, Watson™ computer (trademark of International Business Machine, Inc. Armonk, N.Y.), etc. In selected embodiments, the first computing system and the second computing system are two different computing systems. In other embodiments, the first computing system and the second computing system are a single computing system. An artificial intelligent computer refers to an intelligent computing system adapted to perform a question answering (QA), natural language processing, data retrieval, logical reasoning, machine learning, etc.

At step 304, after processing the corresponding question(s) Qi at the computing system (e.g., QA system 101), one or more candidate responses or answers Ai to the questions (e.g., A1, A2, . . . An) are received. For each question Qi with corresponding answer Ai provided in the answer key, the method 300 passes the question Qi to the QA system and obtains back a corresponding set of answers A1, . . . , An.

Upon receiving the returned answers Ai generated in response to a test question Qi from the QA key, a counter value "i" may be initialized (step 305) so that each answer Ai may be evaluated for correctness with an answer key matching process (step 306). Through the counter incrementation process, the top ranked answer Ai may be evaluated first in a first iterative loop, followed by evaluation of additional answers returned by the QA system. In selected embodiments, each returned answer Ai may be compared to the corresponding answer in the QA key answer using natural language processing techniques to evaluate any desired comparison metric, including but not limited to lexical, syntactic, semantic, entropy, or ngram similarity metric, word overlap, etc. For example, a returned answer Ai may be decomposed by a natural language processor 15 in the first computing system 17 which is configured to identify at least one clause in the received statement, and is configured to separate the received statement according to the identified at least one clause. As will be appreciated, decomposing a statement is a process which takes a given statement as a "complex" fact and identifies at least one clause within the statement. As described herein, a Natural Language Processing (NLP) routine may be used to process the received questions and/or generate a computed answer with associated evidence and confidence measures, where "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. In selected embodiments, the natural language processor 15 is configured to decompose the received statement, e.g., by performing one or more of: (1) identifying syntactic labels (e.g., "this," "that," etc.) in the received statement in which the syntactic labels are indicators for breaking a statement into two or more statements; (2) identifying a conjunction(s) (e.g., "and," "but," etc.) that connects two parallel statements; (3) identifying configuration information of the received statement that includes, but is not limited to: (a) a syntactic contour that shows a main clause and a subordinate clause characterize a same entity, and (b) an indicative of a nested statement that focuses on one of several underspecified entities which do not share their facts; (4) identifying pre-modifiers (e.g., an adjective(s) in front of a named entity) and/or post-modifiers (e.g., an adjective(s) behind of a named entity) in the received statement which separate the received statement into one element and a statement; (5) identifying relative qualifiers (e.g., "the first," "only," "the westernmost," etc.) which need to be completed by information from elsewhere. The natural language processor 15 is configured to separate the received statement according to one or more of: the identified at least one clause, the identified at least one syntactic label, the identified at least one conjunction, the identified configuration information, the identified at least one pre-modifier or post-modifier, and the identified at least one relative qualifier. In selected embodiments, the evaluation of the returned answer Ai at 306 may be computed by the first computing system 17 which applies a semantic or similarity analysis of the returned answer Ai and the answer key answer to compute a first similarity metric which is evaluated against an accuracy threshold to determine if the returned answer is correct.

If the returned answer matches the answer key (affirmative outcome to step 306), the answer Ai is marked as correct for training purposes (step 307), in which case the counter value "i" is incremented (step 308) so that the next answer Ai may be evaluated for correctness with an answer key matching process (step 306). However, if the returned answer does not match the answer key (negative outcome to step 306), then the methodology 300 evaluates the returned answer Ai (which has identified as "incorrect") for possible inclusion in the answer key by exploiting the answer key modification history by first assembling the answer key history and metadata (step 309). Instead of thinking of answer keys as flat, stateless, one-dimensional things, the processing at step 309 exploits the wealth of information that is associated with each answer key answer in the form of file metadata, such as edit history, publication date, authorship, etc. Thus, step 309 may collect from the change set for the answer key the set of all previous answers to the test question along with associated metadata.

Using the assembled answer key history and metadata, a predictive answer Ai' is computed at step 310. For example, a first computing system (e.g., computing system 17) may generate a prediction of the likely current answer and/or range of answers to the test question based on the pattern of changes in the answer key along with the associated metadata. In selected embodiments, any suitable technique may be used to identify patterns from the answer-key change history for use in computing the predictive answer Ai', including but not limited to identifying patterns of numerical change (e.g., linear growth, exponential growth) in the answer. In addition, the processing at step 310 may identify characteristic temporal patterns for answers where certain classes of questions (e.g., "Who is the governor of Virginia?") have answers change on a temporal basis (e.g., every four years) which could provide an indication that the generated answer is not incorrect if the answer key data metadata indicates that the answer key is due for an update (e.g., the answer key is over four years old for this question).

Given a predictive answer Ai', the returned answer Ai is evaluated for matching at step 311. For example, if the predictive answer Ai' generated at step 310 includes a range of correct answers, then the match processing at step 311 may determine if the returned answer Ai falls within that range. If there is no match (negative outcome to decision 311), then the returned answer—having previously been identified as being incorrect—is not a candidate for further review and evaluation as an answer key update candidate, in which case methodology 300 determines if all the returned answers have been evaluated (step 313) then a match is indicated.

On the other hand, if there is a match between the predicted and returned answers (affirmative outcome to decision 311), then the returned answer Ai and/or the predictive answer Ai' may be scored as "correct" or otherwise denoted for additional review and possible inclusion in the answer key without imposing a training process penalty for the returned answer which was identified as incorrect (step 312). To this end, the test question may be flagged along with the returned answer Ai for presentation to the domain expert with an indication that the returned answer should be evaluated for possible answer key inclusion or updating. As will be appreciated, each returned answer Ai that is sent for review may include associated information generated by the QA system, such as the passage from the corpus from which the answer was generated and/or accuracy score, to facilitate that review. In addition or in the alternative, the test question may be flagged with the predictive answer Ai' so that the domain expert is notified to evaluate the predictive answer for a possible answer key update. As a result of step 312, a new answer key may be generated when the domain expert reviews the flagged test question and any highlighted returned answer Ai or predictive answer Ai', and then generates a new version of the key via this curation.

Once the returned answer Ai and/or predictive answer Ai' is presented at step 312, the methodology 300 determines if all the returned answers have been evaluated (step 313). If not (negative outcome to decision step 313), then counter value "i" is incremented (step 314) so that the next answer Ai may be evaluated for correctness with an answer key matching process (step 306). But once all returned answer Ai have been evaluated (affirmative outcome to decision step 313), the process ends (step 315), at which point the answer key evaluation process 300 may await reactivation by the domain expert or according to a predetermined or periodic activation schedule. Alternatively, the information generated by the methodology 300 may be fed to a machine learning process which acts on the training data to evaluate and update the answer key, as appropriate.

In general, the answer prediction processing at steps 310-312 may employ any desired analytic technique which uses past correct answer key answers to a question in order evaluate the current correctness of a generated answer, with particular benefit in the training and test of a deep QA system with frequently updated source data and less frequently updated answer keys.

Selected embodiments of the present disclosure are described with reference to evaluating answer key answers for possible update with respect to one or more generated answers returned by a QA system by using historical answer key answers to calculate or project a projected answer that is compared with and scored against the generated answer(s) to help identify generated answers which should be evaluated for review and possible inclusion as an answer key update. However, it will be appreciated that the present disclosure may be also be applied to evaluate answer key questions in terms of any desired answer key metadata to identify generated questions returned by a question-answer system for inclusion in the answer key, even when such generated answers are scored as incorrect when initially compared to the answer key. In such embodiments, answer key metadata corresponding to a test question that is used to generate an answer from the QA system is used to compare and evaluate the generated answer in terms of computed similarity metric values for purposes of identifying a question-answer pair in the answer key as potentially including an answer key problem and also flagging the generated answer as a candidate answer for updating the answer key.

By now, it will be appreciated that there is disclosed herein a system, method, apparatus, and computer program product for evaluating question-answer pairs in an answer key at a first information handling system having a processor and a memory by exploiting an answer key modification history for the answer key. As disclosed, the system, method, apparatus, and computer program product submit a test question from the answer key to a system capable of answering questions, and then subsequently receive a first generated answer from the system in response to the test question. If there is not a match between the first generated answer and a first answer from the answer key corresponding to the test question, the first information handling system generates a predicted answer to the test question based on the answer key modification history. In selected embodiments, the information handling system generates the predicted answer by analyzing a plurality of correct answers and/or metadata associated with the test question over time, and then computes the predicted answer from the plurality of correct answers and/or metadata. In other embodiments, the predicted answer is generated by applying a statistical analysis of answers in the answer key modification history to define the predicted answer with an interval of values for an accurate answer. In addition, the first information handling system generates an accuracy score based on how closely the predicted answer matches the first generated answer. Finally, the information handling system presents an indication that the answer key may have a problem if the accuracy score indicates there is a match between the predicted answer and first generated answer. In selected embodiments, the indication is presented by flagging the test question with the first generated answer and the accuracy score indication that the first generated answer should be evaluated for updating the answer key. In other embodiments, the indication is presented by flagging the test question with the predicted answer and the accuracy score indication that the predicted answer should be evaluated for updating the answer key. In other embodiments, the indication is presented by identifying a mismatch between the first generated answer and the predicted answer when the accuracy score indication indicates an uncertainty associated with the mismatch. In selected embodiments, the first information handling system applies natural language processing (NLP) to generate the predicted answer, and then applies a lexical, syntactic, semantic, entropy, or ngram similarity metric to compare the predicted answer and first generated answer.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of exploiting an answer key modification history comprising:

submitting, by a first information handling system comprising a processor and a memory, a test question from an answer key to a system capable of answering questions;

receiving, by the first information handling system, a first generated answer generated by the system in response to the test question;

generating, by the first information handling system, a predicted answer to the test question based on the answer key modification history if there is not a match between the first generated answer and a first answer from the answer key corresponding to the test question;

training, by the first information handling system, a machine learning process to evaluate the predicted answer against the first answer to identify an answer key update candidate from the predicted answer or the first answer that improves a functional accuracy of the answer key;

generating, by the first information handling system, an accuracy score based on how closely the predicted answer matches the first generated answer; and presenting, by the first information handling system, an indication that the answer key should be updated with the answer key update candidate if the accuracy score indicates there is a match between the predicted answer and first generated answer.

2. The method of claim 1, where generating the predicted answer comprises:

analyzing, by the first information handling system, a plurality of correct answers and/or metadata associated with the test question over time; and computing the predicted answer from the plurality of correct answers and/or metadata.

3. The method of claim 1, where the first information handling system applies natural language processing (NLP) to generate the predicted answer, and then applies a lexical, syntactic, semantic, entropy, or ngram similarity metric to compare the predicted answer and first generated answer.

4. The method of claim 1, where generating the predicted answer comprises applying a statistical analysis of answers in the answer key modification history to define the predicted answer with an interval of values for an accurate answer.

5. The method of claim 1, where presenting the indication comprises flagging the test question with the first generated answer and the accuracy score indication that the first generated answer should be evaluated for updating the answer key.

6. The method of claim 1, where presenting the indication comprises flagging the test question with the predicted answer and the accuracy score indication that the predicted answer should be evaluated for updating the answer key.

7. The method of claim 1, where presenting the indication comprises identifying a mismatch between the first generated answer and the predicted answer when the accuracy score indication indicates an uncertainty associated with the mismatch.

8. The method of claim 1, where generating the accuracy score comprises comparing the predicted answer and first generated answer by applying a lexical, syntactic, semantic, entropy, or ngram similarity metric.

* * * * *